United States Patent [19]

Lyon, II

[11] Patent Number: 5,170,527
[45] Date of Patent: Dec. 15, 1992

[54] SELF-ALIGNING ANTI-LIFT DEVICE FOR WINDSHIELD WIPERS

[76] Inventor: Walter E. Lyon, II, 250 Hutchinson Rd., Englewood, N.J. 07631

[21] Appl. No.: 833,132

[22] Filed: Feb. 10, 1992

[51] Int. Cl.$^5$ .............................................. B60S 1/32
[52] U.S. Cl. ................................ 15/250.42; 15/250.20
[58] Field of Search ........... 15/250.20, 250.41, 250.42, 15/250.35, 250 R, 250.31; 416/9, 12, 13, 55, 59; 296/180.1

[56] References Cited

U.S. PATENT DOCUMENTS

| | | | |
|---|---|---|---|
| 2,794,203 | 6/1957 | Oishei | 15/250.42 |
| 3,685,086 | 8/1972 | Frohlich | 15/250.35 |
| 4,464,808 | 8/1984 | Berry | 15/250.35 |

FOREIGN PATENT DOCUMENTS

| | | | |
|---|---|---|---|
| 907399 | 2/1954 | Fed. Rep. of Germany | 416/9 |
| 543635 | 3/1942 | United Kingdom | 15/250.20 |

*Primary Examiner*—Philip R. Coe
*Assistant Examiner*—Gary K. Graham
*Attorney, Agent, or Firm*—Samuelson & Jacob

[57] ABSTRACT

An anti-lift device for windshield wipers includes deflector members mounted for pivotal movement and including deflector elements for interacting with the airstream passing over a windshield wiper to establish a biasing force tending to urge the windshield wiper toward the windshield of a vehicle, and director elements interacting with the airstream for pivoting the deflector elements as the windshield wiper sweeps across the windshield in a predetermined arc of movement so as to maintain the deflector elements essentially normal to the airstream and thereby optimize the biasing force throughout the arc of movement.

14 Claims, 1 Drawing Sheet

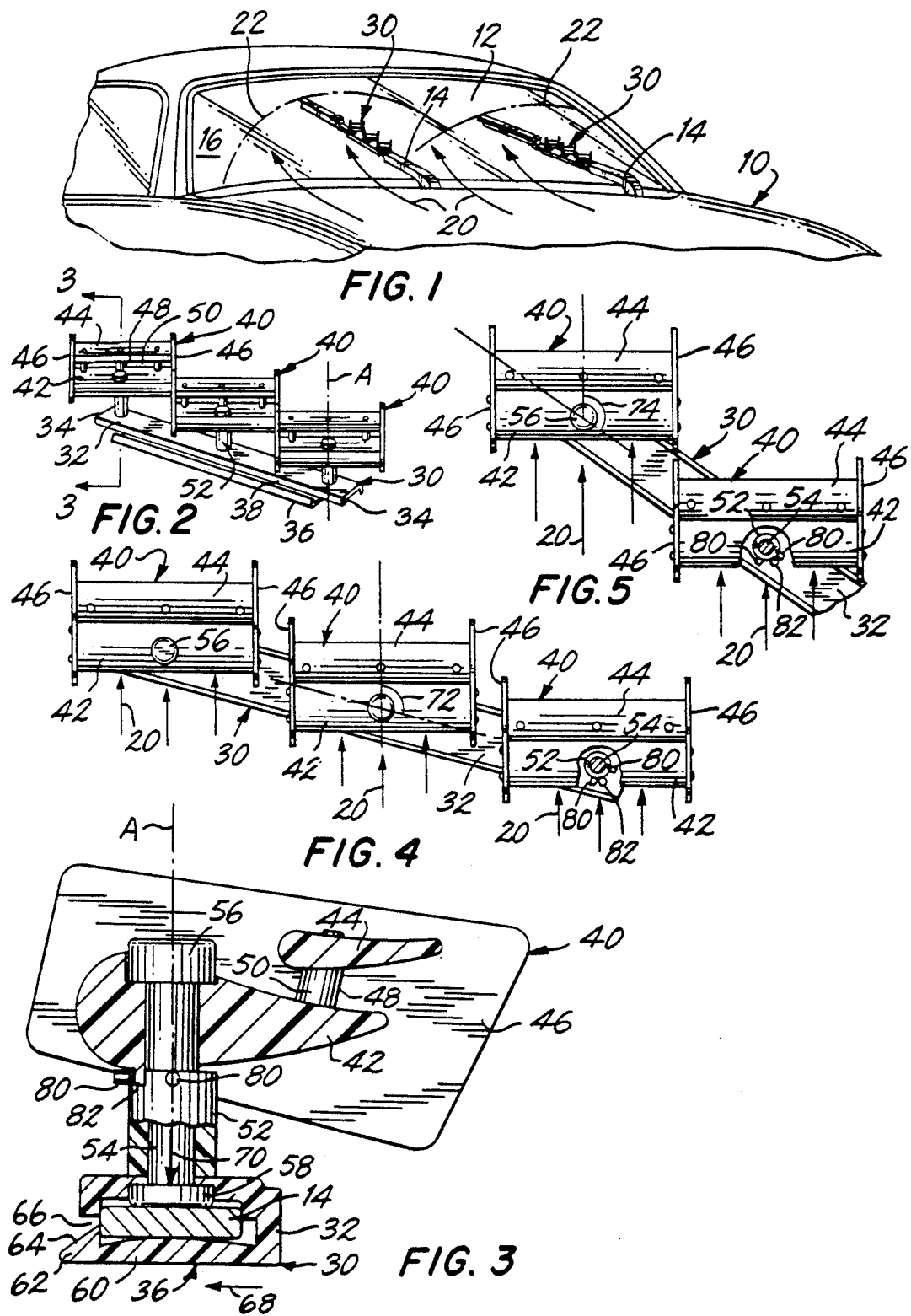

SELF-ALIGNING ANTI-LIFT DEVICE FOR WINDSHIELD WIPERS

BACKGROUND OF THE INVENTION

The present invention relates generally to windshield wipers for vehicles and pertains, more specifically, to an anti-lift device for interacting with an oncoming airstream which passes over a windshield to bias a windshield wiper toward the windshield as the windshield wiper sweeps across the windshield.

Anti-lift devices have been used in connection with vehicle windshield wipers for some time now. In general, these devices rely upon interaction with the airstream which passes across the windshield to resist any tendency toward lifting of the windshield wiper from the windshield and to bias the windshield wiper against the windshield. Thus, vane-like members usually are employed to establish reaction forces which are directed toward the windshield and thus urge the windshield wiper against the windshield.

However, during use, a windshield wiper sweeps through a predetermined arc of movement across the windshield, thereby continuously changing the angle of incidence of the airstream on the vane-like members, with the result that the biasing force varies as the windshield wiper traverses the arcuate path of travel. Consequently, the force with which the windshield wiper is urged toward the windshield is not consistent and may become ineffective to hold the windshield wiper against the windshield in at least some positions of the windshield wiper within the arc of movement.

SUMMARY OF THE INVENTION

The present invention provides an anti-lift device for windshield wipers which is self-aligning so as to maintain an optimum force for biasing the windshield wiper toward the windshield throughout the arc of movement of the windshield wiper as the windshield wiper sweeps across the windshield. As such, the present invention attains several objects and advantages, some of which are summarized as follows: Maintains optimum biasing force on a windshield wiper for urging the windshield wiper against a windshield as the windshield wiper sweeps the windshield in an oncoming airstream; provides a self-aligning arrangement in an anti-lift device for windshield wipers so that an optimum biasing force is maintained independent of the position of the windshield wiper throughout the range of movement of the windshield wiper as the windshield wiper sweeps through an arc of movement across a windshield; enables simplified installation and effective use for enhancement of the operation of existing windshield wipers at minimal expense; provides an aesthetically pleasing addition to windshield wipers; provides a simple yet rugged construction for exceptional performance over an extended service life; is capable of economical manufacture in large numbers of uniform high quality.

The above objects and advantages, as well as further objects and advantages, are attained by the present invention which may be described briefly as an anti-lift device for windshield wipers subjected to an oncoming airstream passing across a windshield as the windshield wipers sweep the windshield through a predetermined arc of movement along directions transverse to the direction of the oncoming airstream, the anti-lift device comprising: a base frame having opposite ends and extending longitudinally between the opposite ends; a plurality of deflector members on the base frame and spaced longitudinally along the base frame; each deflector member including at least one deflector element and at least one director element; and mounting means mounting each deflector member upon the base frame for pivotal movement about a pivotal axis relative to the base frame, the director elements being oriented relative to the pivotal axis and relative to the corresponding deflector elements such that the director elements are urged by the airstream into alignment with the airstream direction and maintain the corresponding deflector elements essentially normal to the airstream direction throughout the predetermined arc of movement for establishing optimum forces tending to bias the deflector members, and the windshield wiper, toward the windshield.

BRIEF DESCRIPTION OF THE DRAWINGS

The invention will be understood more fully, while still further objects and advantages will become apparent, in the following detailed description of a preferred embodiment of the invention illustrated in the accompanying drawing, in which:

FIG. 1 is a pictorial illustration of anti-lift devices of the present invention installed on the windshield wipers of an automobile;

FIG. 2 is a perspective view of one of the anti-lift devices;

FIG. 3 is an enlarged cross-sectional view taken along line 3—3 of FIG. 2;

FIG. 4 is an enlarged top plan view of the anti-lift device in one operating position during use of the corresponding windshield wiper, with portions broken away to reveal details of construction; and FIG. 5 is a fragmentary top plan view similar to FIG. 4, but with the anti-lift device in another operating position.

DETAILED DESCRIPTION OF THE PREFERRED EMBODIMENT

Referring now to the drawing, and especially to FIG. 1 thereof, a vehicle in the form of an automobile 10 includes a windshield 12 which is being swept by two windshield wipers 14, in a conventional manner. As the automobile 10 proceeds and the windshield wipers 14 sweep the outer surface 16 of the windshield 12, the windshield 12 and the windshield wipers 14 are subjected to an oncoming airstream 20 which flows along the windshield 12 and over the windshield wipers 14 in directions falling within planes generally parallel to the direction in which the automobile 10 is proceeding and generally parallel to the outer surface 16 of the windshield 12, as indicated by the arrows in FIG. 1. Each windshield wiper 14 sweeps back and forth through an arc of movement 22 transverse to the direction of the oncoming airstream 20. The interaction between the oncoming airstream 20 and the windshield wipers 14 tends to lift the windshield wipers 14 away from the outer surface 16 of the windshield 12, thereby reducing the ability of the windshield wipers 14 to perform satisfactorily.

In order to counteract the forces tending to lift the windshield wipers 14 away from the windshield 12, each windshield wiper 14 is provided with an anti-lift device 30 constructed in accordance with the present invention. As best seen in FIG. 2, as well as in FIG. 1, anti-lift device 30 includes a base frame 32 having longitudinally opposite ends 34 and securing means in the form of a clip 36 integral with the base frame 32 and extending along the underside 38 of the base frame 32 for securing the base frame 32 to the windshield wiper 14, as will be explained more fully below. A plurality of deflector members 40 are mounted on the base frame 32 and are spaced from one another longitudinally along the base frame 32 between the opposite ends 34. Each deflector member 40 includes a first or lower deflector element 42 and a second or upper deflector element 44. The lower and upper deflector elements 42 and 44 extend longitudinally between director elements 46 which are placed at the opposite ends of the deflector elements 42 and 44 and extend in an altitudinal direction. The deflector elements 42 and 44 are spaced altitudinally from one another by spacers 48 so that a slot 50 is provided between the lower deflector element 42 and the upper deflector element 44 of each deflector member 40. In the preferred arrangement, the deflector elements 42 and 44 are staggered laterally so that the lower deflector element 42 is somewhat forward or upstream of the upper deflector element 44 in each deflector member 40.

Turning now to FIG. 3, as well as to FIGS. 1 and 2, each deflector member 40 is mounted on the base frame 32 by mounting means in the form of a sleeve 52 integral with the base frame 32 and extending altitudinally generally perpendicular to the longitudinal extent of the base frame 32, and a pin 54 extending along an altitudinal axis A through the sleeve 52. Pin 54 extends into the base frame 32 and is journaled within the lower deflector element 42, the pin 54 being captured in place by an upper head 56 and a lower head 58, so that deflector member 40 is mounted for pivotal movement relative to base frame 32 about altitudinal axis A, which axis A is generally normal to the outer surface 16 of windshield 12. Clip 36 is seen to include a resilient cantilever clip member 60 and a latch 62 at the free end of the cantilever member 60. The latch 62 includes an inclined surface 64 adjacent the mouth 66 of the clip 36 so that the base frame 32 readily is slipped over the corresponding windshield wiper 14 in a lateral direction, as indicated by arrow 68 in FIG. 3, until the latch 62 becomes engaged, as illustrated, to secure the base frame 32 upon the windshield wiper 14.

Each deflector element 42 and 44 has a wing-like construction which includes an airfoil shaped cross-sectional configuration, as seen in FIG. 3. The airfoil shaped cross-sectional configuration is configured and arranged so that as an airstream passes laterally over the deflector elements 42 and 44, and through slot 50 between the deflector elements 42 and 44, a downward force will be established, as indicated by force 70 shown in FIG. 3. The director elements 46 have a fin-like construction extending in an altitudinal direction. Thus, upon securing anti-lift device 30 to a windshield wiper 14 and exposing the windshield wiper 14 to oncoming airstream 20, each deflector member 40 interacts with the airstream 20 to establish a downward force 70 which biases the windshield wiper 14 toward the windshield 12.

As best seen in FIGS. 4 and 5, as the windshield wiper 14 sweeps through the arc of movement 22, the director elements 46 react with the airstream 20 to swivel the deflector member 40 so as to maintain the longitudinal extent of the deflector elements 42 and 44 essentially normal to the direction of the airstream 20, thereby optimizing the force 70 throughout the arc of movement 22 of the windshield wiper 14. As seen in FIG. 4, windshield wiper 14 is at an angle 72 with the oncoming airstream 20 and the director elements 46 react with the airstream 20 to align the director elements 46 with the direction of the airstream 20 and place the deflector elements 42 and 44 transverse to and generally normal to the direction of the airstream 20. In FIG. 5, the windshield wiper 14 is at an angle 74 with the oncoming airstream 20 and the director elements 46 maintain the orientation of the deflector member 40 where the deflector elements 42 and 44 are generally normal to the direction of the airstream 20. Hence, the self-aligning feature provided by the construction and the pivotal mounting of each deflector member 40 for free swiveling movement maintains an optimum biasing force which urges the windshield wipers 14 toward the windshield throughout the arc of movement 22.

Stop means are provided for limiting the pivotal movement of each deflector member 40 to a range of angular movement within which the deflector elements 42 and 44 are maintained essentially normal to the airstream direction as the windshield wipers 14 move through the predetermined arc of movement 22. A pair of stop bars 80 extend radially from the sleeve 52 and are spaced circumferentially from one another at an angle of about ninety degrees. A projection 82 extends downwardly from the lower deflector element 42 and is placed between the stop bars 80 so that the swiveling movement of each deflector member 40 is confined to the range defined by engagement of the projection 82 with the stop bars 80, as illustrated in FIGS. 4 and 5. In this manner, appropriate orientation of the deflector members 40 is assured under essentially all operating conditions.

All of the component parts of the anti-lift device 30 are constructed readily of polymeric materials for economy of manufacture and for a long service life under all of the operating conditions encountered in the field. The device 30 is adapted readily to existing windshield wipers 14 for widespread immediate use.

It will be seen that the present invention attains all of the objects and advantages summarized above; namely: Maintains optimum biasing force on a windshield wiper for urging the windshield wiper against a windshield as the windshield wiper sweeps the windshield in an oncoming airstream; provides a self-aligning arrangement in an anti-lift device for windshield wipers so that an optimum biasing force is maintained independent of the position of the windshield wiper throughout the range of movement of the windshield wiper as the windshield wiper sweeps through an arc of movement across a windshield; enables simplified installation and effective use for enhancement of the operation of existing windshield wipers at minimal expense; provides an aesthetically pleasing addition to windshield wipers; provides a simple yet rugged construction for exceptional performance over an extended service life; is capable of economical manufacture in large numbers of uniform high quality.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An anti-lift device for a windshield wiper subjected to an oncoming airstream passing across a windshield as the windshield wiper sweeps the windshield through a predetermined arc of movement along directions transverse to the direction of the oncoming airstream, the anti-lift device comprising:

a base frame for placement on the windshield wiper for movement with the windshield wiper through the predetermined arc of movement, the base frame having opposite ends and extending longitudinally between the opposite ends;

a plurality of deflector members on the base frame and spaced longitudinally along the base frame;

each deflector member including at least one deflector element and at least one director element; and mounting means mounting each deflector member upon the base frame for pivotal movement about a pivotal axis relative to the base frame, each director element having a configuration and being oriented relative to the pivotal axis and relative to the corresponding deflector element such that upon placement of the base frame on the windshield wiper for movement of the base frame with the windshield wiper through the predetermined arc of movement the director elements are urged by the airstream into alignment with the airstream direction and maintain the corresponding deflector elements essentially normal to the airstream direction throughout the predetermined arc of movement, the deflector elements having a configuration for establishing optimum forces tending to bias the deflector members, the base frame, and the windshield wiper, toward the windshield while the base frame moves with the windshield wiper through the predetermined arc of movement, and the deflector elements are maintained by the director elements essentially normal to the airstream direction, throughout the predetermined arc of movement.

2. The invention of claim 1 wherein upon movement of the base frame with the windshield wiper throughout the predetermined arc of movement each pivotal axis extends in an altitudinal direction, generally normal to the windshield, and each deflector member includes first and second deflector elements having opposite ends and being spaced altitudinally from one another.

3. The invention of claim 2 wherein the configuration of each deflector element includes an airfoil shaped cross-sectional configuration.

4. The invention of claim 2 wherein the first deflector element is located altitudinally below the second deflector element and the first and second deflector elements are staggered laterally relative to one another so that the first deflector element is located upstream of the second deflector element in relation to the airstream.

5. The invention of claim 2 wherein each deflector member includes first and second director elements, each director element extending in an altitudinal direction and being located at respective opposite ends of the deflector elements.

6. The invention of claim 5 wherein each director element includes an altitudinally extending fin-like configuration and each deflector element includes a wing-like construction extending between corresponding director elements and having an airfoil shaped cross-sectional configuration.

7. The invention of claim 1 including securing means on the base frame for securing the base frame on the windshield wiper.

8. The invention of claim 1 including stop means for limiting the pivotal movement of each deflector member to a range of angular movement within which the deflector elements are maintained essentially normal to the airstream direction as the windshield wiper moves through the predetermined arc of movement.

9. The invention of claim 8 wherein upon movement of the base frame with the windshield wiper throughout the predetermined arc of movement each pivotal axis extends in an altitudinal direction, generally normal to the windshield, and each deflector member includes first and second deflector elements having opposite ends and being spaced altitudinally from one another.

10. The invention of claim 8 wherein the configuration of each deflector element includes an airfoil shaped cross-sectional configuration.

11. The invention of claim 8 wherein the first deflector element is located altitudinally below the second deflector element and the first and second deflector elements are staggered laterally relative to one another so that the first deflector element is located upstream of the second deflector element in relation to the airstream.

12. The invention of claim 8 wherein each deflector member includes first and second director elements, each director element extending in an altitudinal direction and being located at respective opposite ends of the deflector elements.

13. The invention of claim 12 wherein each director element includes an altitudinally extending fin-like configuration and each deflector element includes a wing-like construction extending between corresponding director elements and having an airfoil shaped cross-sectional configuration.

14. The invention of claim 8 including securing means on the base frame for securing the base frame on the windshield wiper.

* * * * *